(12) United States Patent
Chien et al.

(10) Patent No.: US 7,753,324 B2
(45) Date of Patent: Jul. 13, 2010

(54) SUCKING DISC APPARATUS CAPABLE OF DETECTING ADHESIVE FORCE

(76) Inventors: Li-Sheng Chien, 5F., No. 67, Lane 201, Jhongjheng Rd., Shihlin District, Taipei City 111 (TW); Chien-Chang Ho, 5F., No. 8, Alley 1, Lane 25, Fongjiang Rd., Taishan Township, Taipei County 243 (TW)

( * ) Notice: Subject to any disclaimer, the term of this patent is extended or adjusted under 35 U.S.C. 154(b) by 160 days.

(21) Appl. No.: 12/190,623

(22) Filed: Aug. 13, 2008

(65) Prior Publication Data

US 2010/0038503 A1 Feb. 18, 2010

(51) Int. Cl.
*A45D 42/14* (2006.01)
(52) U.S. Cl. .................................................. 248/205.8
(58) Field of Classification Search ................. 248/683, 248/467, 205.5, 206.3, 206.2, 309.3, 363
See application file for complete search history.

(56) References Cited

U.S. PATENT DOCUMENTS

| | | | | |
|---|---|---|---|---|
| 2,730,325 A | * | 1/1956 | Van Dusen et al. | 248/205.8 |
| 3,180,604 A | * | 4/1965 | Hammer | 248/205.8 |
| 5,087,005 A | * | 2/1992 | Holoff et al. | 248/205.8 |
| 5,909,758 A | * | 6/1999 | Kitamura | 16/406 |
| 7,229,059 B1 | * | 6/2007 | Hood | 248/518 |

* cited by examiner

*Primary Examiner*—J. Allen Shriver, II
*Assistant Examiner*—Erin Smith
(74) *Attorney, Agent, or Firm*—Schmeiser, Olsen & Watts, LLP

(57) ABSTRACT

A sucking disc apparatus capable of detecting adhesive force comprises a rod body, a sucking disc at the rod body and corresponding to its slot, a pressing rod pivotally coupled to the slot or the sucking disc and turned with respect to the rod body and abutted at the sucking disc, an operating rod installed in a slide of the rod body and slid with respect to the slide, a first identification element installed in a containing space of the rod body by an axial shaft and having a first color corresponding to an opening of the rod body, and a second identification element coaxially and pivotally installed at the axial shaft and the operating rod and turned with respect to the first identification element and stacked onto the first identification element, and including a second color different from the first color and corresponding to the opening.

10 Claims, 4 Drawing Sheets

US 7,753,324 B2

SUCKING DISC APPARATUS CAPABLE OF DETECTING ADHESIVE FORCE

FIELD OF THE INVENTION

The present invention relates to an improved sucking disc apparatus capable of detecting an adhesive force, and more particularly to a sucking disc apparatus with an improved structure capable of detecting an adhesive force and improving the convenience of manufacture and use of the apparatus.

BACKGROUND OF THE INVENTION

Handelbar is commonly used in the bathroom to prevent accidents from occurring, by installing the handlebar at an appropriate position in the bathroom, accidents, such as caused by a slippery wet floor, can be prevented, and the handlebar is particularly important for elderly people and handicaps.

A conventional handlebar is composed of a rod body and fixing portions in an arc shape and disposed on both ends of the rod body. During installation, holes are drilled on at appropriate positions on a wall, and the fixing portions on both ends of the rod body are fixed into the corresponding holes of the wall by a plurality of screws.

Although the aforementioned conventional handlebar can be provided extra support for the users to prevent accidents from occurring such as, the slippery wet floor. But, the installation procedure is relatively complicated, and the removal and replacement are not inconvenient. Furthermore, the holes are left on the wall after the handlebar has been removed, which affects the overall appearance of the bathroom.

To overcome the foregoing shortcomings, the manufacturers developed a sucking disc handlebar that can be installed and removed easily, and the sucking disc handlebar is composed of a rod body and a pressing rod with sucking discs that are disposed on both ends of the rod body respectively. In an installation process, it is not necessary to use any tool to attach the sucking discs onto appropriate positions on a wall, directly pressing the sucking disc with the pressing rod (by means of the principle of a cam) onto the wall, the sucking discs can be located firmly on the wall.

Since the sucking disc is designed and used on a wall of ceramic tiles or a smooth surface to achieve the adhesive effect, steam generated in a bathroom usually causes the sucking disc to fall off or slide off from the wall. However, the users normally hardly notice the loosened or slid sucking disc because the pressing rod will not pop up in this situation and thus the users continue using and grabbing the handlebar. As a result, the conventional sucking disc cannot prevent the accidents from happening effectively. On the contrary, its defects can be endangered to the users.

In view of the foregoing problem, the manufacturers further developed a sucking disc with a device indicating the adhesive force, and the apparatus mainly utilizes different colors, such as red and green color, to show the adhesive states of the sucking disc.

However, it is necessary to manufacture a device with different colors for indicating the adhesive states of a sucking disc, thus the manufacture process became more complicated. Furthermore, an additional operating procedure (a secondary manufacture) is required to achieve the effect of determining the adhesive states of the sucking disc. For example, an adhesive tape is used for the adhesion, but the tape cannot be used for a long time, and it will eventually come off easily due to the steam generated in a bathroom, and the adhesive tape arrangement cannot achieve the effect efficiently of determining the adhesive states of the sucking disc, thus, the conventional sucking disc apparatus requires improvements.

Therefore, it is a main subject of the present invention to disclose a sucking disc type apparatus with a structure capable of detecting an adhesive force, and improving the convenience of manufacture and use of the sucking disc type apparatus

SUMMARY OF THE INVENTION

In view of the foregoing shortcomings of the conventional handlebar adhesive device, the inventor of the present invention based on years of experience to conduct extensive researches and experiments, and finally developed a sucking disc apparatus with an improved structure capable of detecting an adhesive force in accordance with a preferred embodiment of the present invention to overcome the shortcomings of the prior art and improve the manufacture process and usage of the sucking disc apparatus.

It is a primary objective of the present invention to provide an improved sucking disc apparatus capable of detecting an adhesive force and the improved structure of the apparatus is to achieve the objectives of easy to be manufactured and effective usage of the sucking disc apparatus.

To achieve the foregoing objectives, the improved sucking disc apparatus capable of detecting an adhesive force in accordance with a preferred embodiment of the invention, comprises a rod body, at least one sucking disc, at least one pressing rod, at least one operating rod, at least one first identification element, and at least one second identification element.

The rod body further comprises at least one slot, at least one slide, at least one containing space, and at least one opening, wherein the slide, the containing space and the opening are interconnected with each other, and the slide has a flange protruded from the slide. The sucking disc is installed at the rod body and is corresponding to the slot, and the sucking disc further comprises a spring with both ends abutted at the sucking disc and the rod body respectively. The pressing rod is pivotally coupled to either the slot or the sucking disc, and is turned with respect to the rod body and abutted at the sucking disc.

The operating rod is slidably disposed in the slide and is slid with respect to the rod body, and the operating rod comprises a first end, a second end and a return spring, wherein the first end is protruded out from the rod body, and the second end is protruded out from the containing space, and both ends of the return spring are abutted at the flange and the first end respectively.

The first identification element comprises an axial shaft for installing the first identification element into the containing space. The first identification element has a first color corresponding to an opening. The second identification element is coaxially and pivotally coupled to the axial shaft and is pivotally coupled to the second end, and the second identification element is turned with respect to the first identification element and stacked onto first identification element. The second identification element has a second color corresponding to an opening, and the second color and the first color are different colors.

With the foregoing apparatus, the first identification element and the second identification element can be manufactured with different colors easily. For example, the first identification element and the second identification element can be manufactured by using different molds, or one of the identification elements can be made in a red color, and the other can be made in a green color. In addition, the present invention does not have the problem of a peeled off adhesive tape of the conventional apparatus. In other words, the first identification element and the second identification element can be used to achieve the effect of determining the adhesive states of the sucking disc apparatus efficiently, and the present invention can improve the manufacturing process and the usage of the sucking disc type apparatus.

DESCRIPTION OF THE PREFERRED EMBODIMENT

The above and other objects, features and advantages of the present invention will become apparent from the following detailed description taken with the accompanying drawing.

Figure 1:
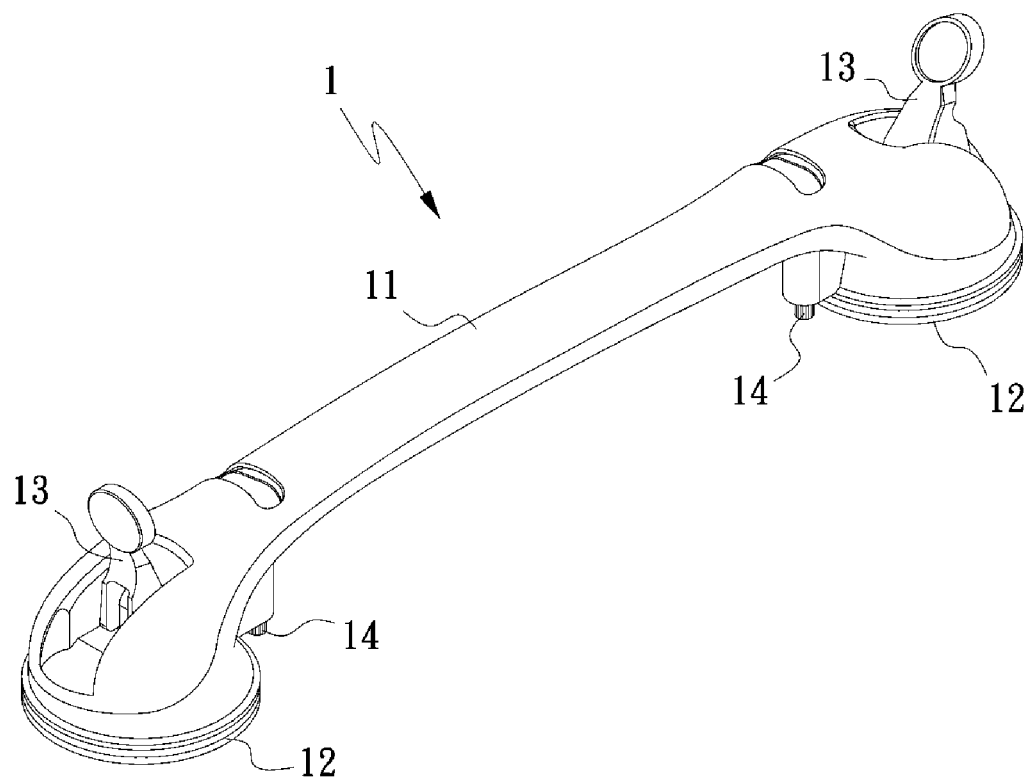
FIG. 1 is a perspective view of a preferred embodiment of the invention.

With reference to FIG. 1 for a perspective view of a preferred embodiment of the present invention, an improved sucking disc apparatus capable of detecting an adhesive force 1 is shown, and a handlebar capable of adhering on a wall firmly via both ends, wherein one end of the handlebar is described here for the illustration purpose.

Figure 2:
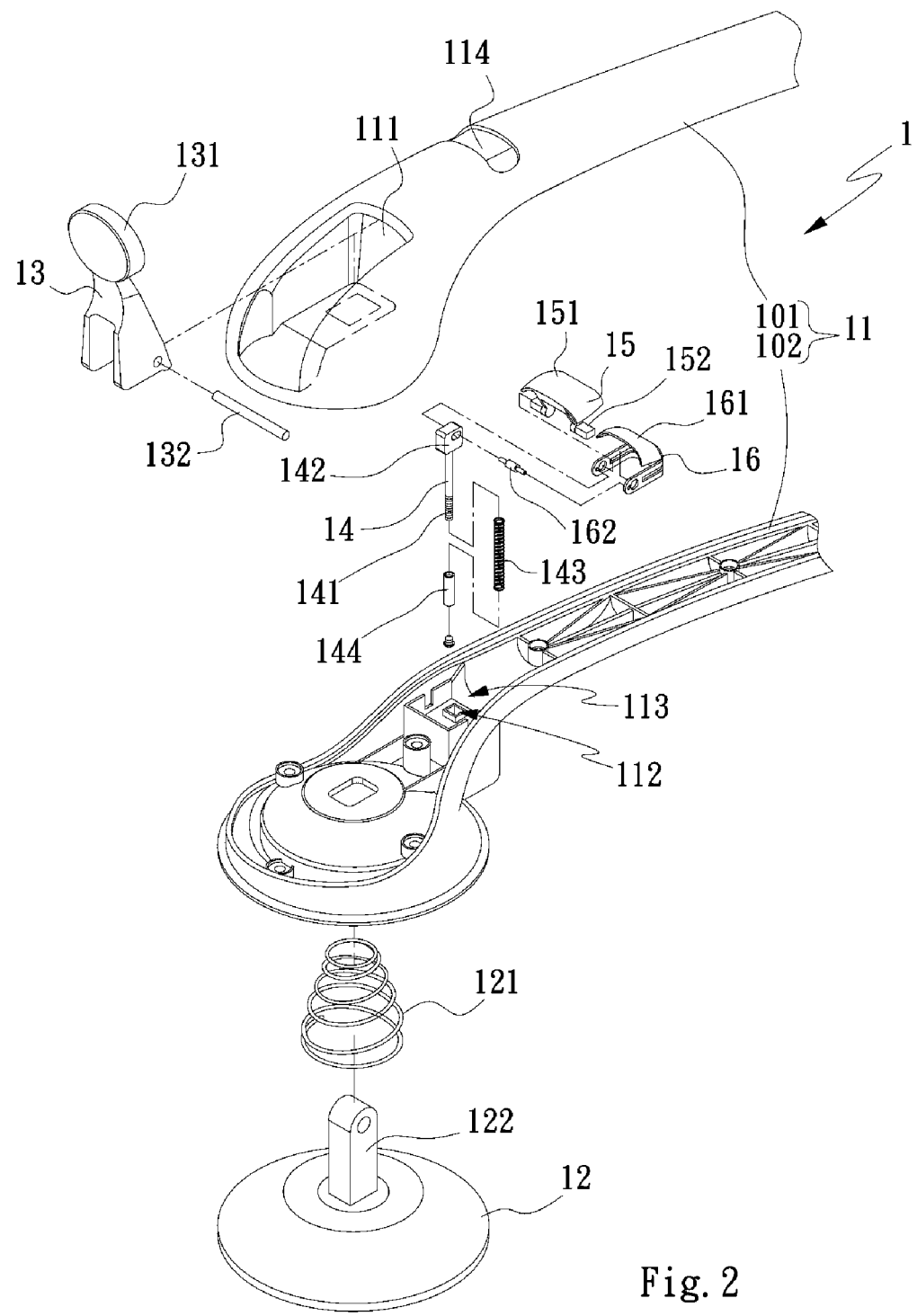
FIG. 2 is an exploded view of a preferred embodiment of the invention.

With reference to FIG. 2 for an exploded view of a preferred embodiment of the invention and FIG. 1, an improved sucking disc apparatus 1 comprises a rod body 11, a sucking disc 12, a pressing rod 13, an operating rod 14, a first identification element 15, and a second identification element 16. In FIG. 2, one end of the improved sucking disc apparatus 1 is shown, and the other end is not shown. It is noteworthy to point out that both ends have the same structure.

Figure 3:
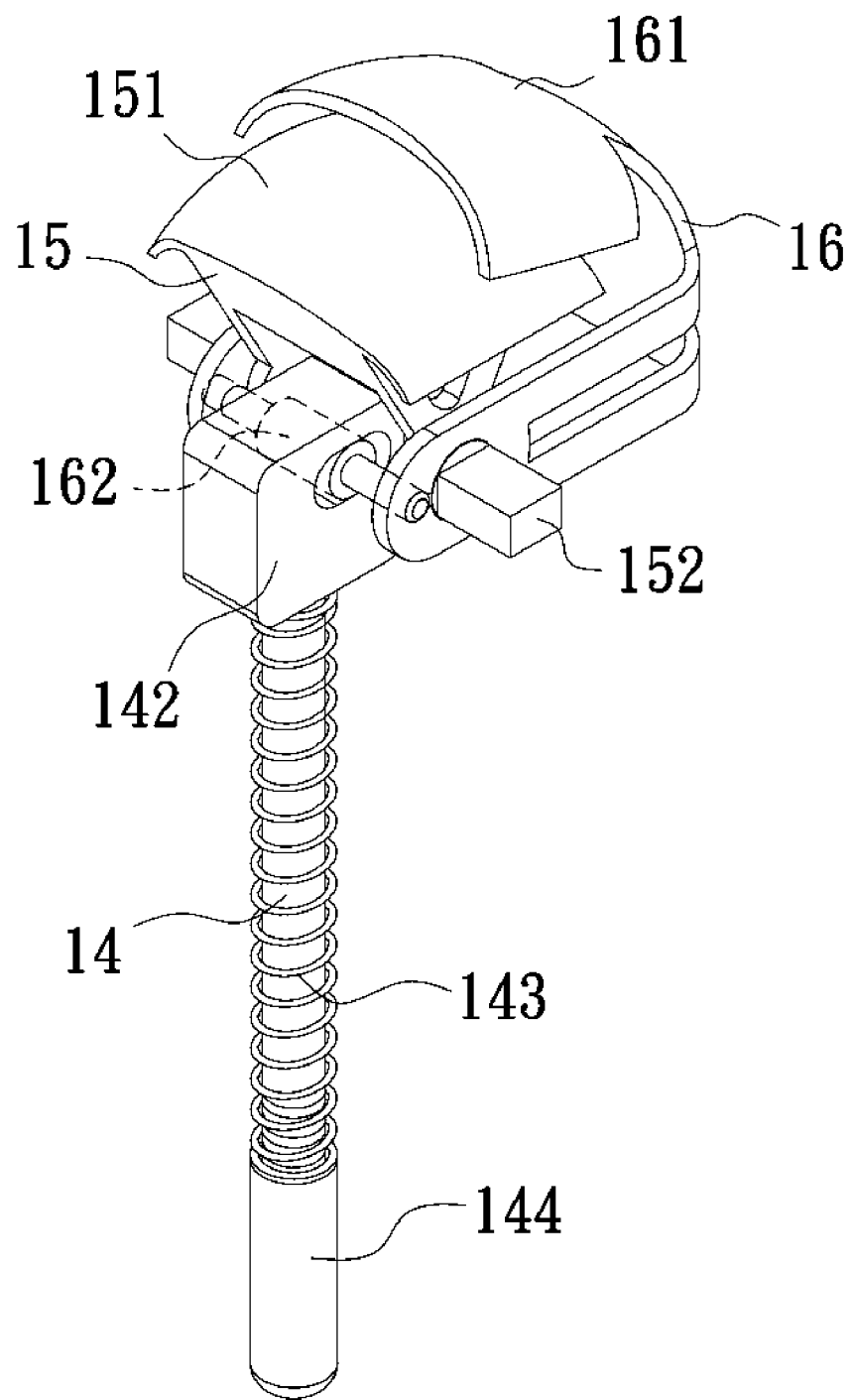
FIG. 3 is a perspective view of an element for detecting an adhesive in accordance to a preferred embodiment of the invention.
Figure 4:
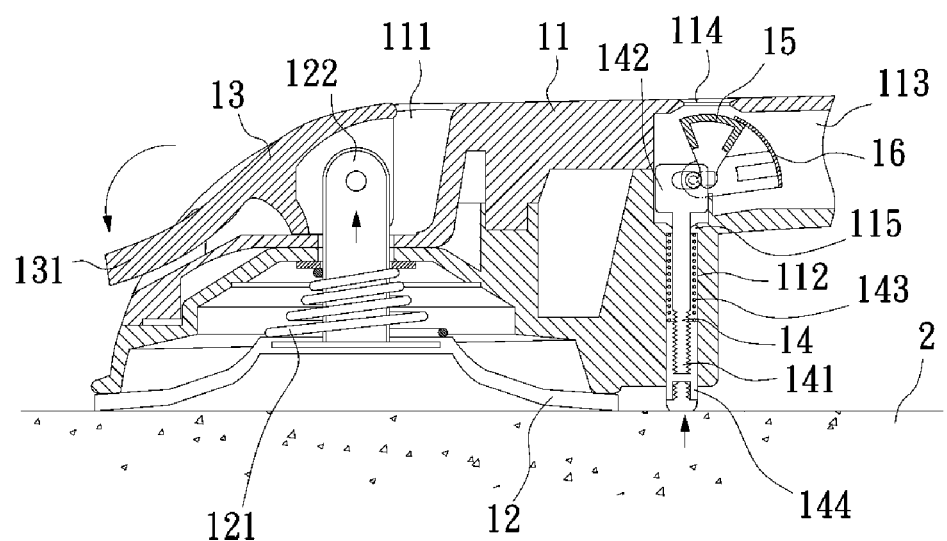
FIG. 4 is a cross-sectional view of a preferred embodiment of the invention.

In FIGS. 2 to 4, FIG. 3 shows a perspective view of an element of detecting adhesive force in accordance with the preferred embodiment of the present invention, and FIG. 4 shows a cross-sectional view of the preferred embodiment of the invention.

In the preferred embodiment, the rod body 11 is composed of a cover 101 and a base 102 engaged with each other, and the rod body 11 further comprises a slot 111, a slide 112, a containing space 113 and an opening 114, wherein the slide 112, the containing space 113 and the opening 114 are interconnected with each other, and the slide 112 has a flange 115 protruded thereon.

In the preferred embodiment, the slot 111 is disposed at the cover 101, and the slide 112 is disposed at the base 102, and the containing space 113 is formed and enclosed by the cover 101 and the base 102, and the opening 114 is disposed at the cover 101.

In addition, the sucking disc 12 is disposed at the rod body 11 and is corresponding to the slot 111, and the sucking disc 12 comprises a spring 121 with both ends abutted at the sucking disc 12 and the rod body 11 respectively. The pressing rod 13 is pivotally coupled to sucking disc 12, and it is turned with respect to the rod body 11, and is abutted at the sucking disc 12.

In the preferred embodiment, the pressing rod 13 comprises an operating portion 131, the sucking disc 12 comprises a protruding rod 122 protruded out from the slot 111 of the rod body 11, and the pressing rod 13 is pivotally coupled to the protruding rod 122 by an axle 132. The spring 121 of the sucking disc 12 is sheathed onto the protruding rod 122, and both ends of the spring 121 are abutted at the sucking disc 12 and the rod body 11 respectively.

The design of the improved sucking disc apparatus can be modified by directly and pivotally coupling the pressing rod 13 with the slot 111 of the rod body 11. In addition of using an axle, a method of engaging a protrusion and a recession can be adopted to achieve the same rotating effect.

The operating rod 14 is installed in the slide 112 of the rod body 11 and is slid with respect to the rod body 11, and the operating rod 14 comprises a first end 141, a second end 142 and a return spring 143, wherein the first end 141 is protruded out from the rod body 11, and the second end 142 is protruded out from the containing space 113, and both ends of the return spring 143 are abutted at the flange 115 and the first end 141 respectively.

In the preferred embodiment, the first end 141 of the operating rod 14 comprises a sleeve 144 sheathed onto the first end 141, and the return spring 143 is abutted at the sleeve 144. The sleeve 144 can be sheathed or secured onto the first end 141 by means of a screw thread. Of course, any other equivalent methods can be adopted for the same effect.

The first identification element 15 comprises an axial shaft 152 for installing the first identification element 15 into the containing space 113 of the rod body 11 by an axial shaft 152. The first identification element 15 comprises a first color 151 corresponding to the opening 114 of the rod body 11. The second identification element 16 is coaxially and pivotally coupled to the first identification element 15 by the axial shaft 152, and is pivotally coupled to a second end 142 of the operating rod 14 by an axle 162, wherein the second identification element 16 is turned with respect to the first identification element 15 and is stacked onto the first identification element 15. The second identification element 16 comprises a second color 161 corresponding to the opening 114 of the rod body 11, and the second color 161 and the first color 151 are different colors. For example, the first color 151 is a green color, and the second color 161 is a red color.

In the preferred embodiment, the first identification element 15 is in a fan-shape, and the second identification element 16 is in an arc shape, wherein the second identification element 16 is stacked at the first identification element 15 and disposed on the top of the first identification element 15.

In FIGS. 2 to 4, the sucking disc apparatus 1 is attached onto a wall 2 by pressing the operating portion 131 of the pressing rod 13 to turn the pressing rod 13 with respect to the rod body 11 (as shown in the turning arrow of FIG. 4) and abut the pressing rod 13 at the sucking disc 12. By means of the principle of a cam, the sucking disc 12 is attached onto the wall 2. Now, the first end 141 is abutted by the wall 2 to move upward. The second end 142 of the operating rod 14 drives the second identification element 16 to turn with respect to the first identification element 15 in order to separate the second identification element 16 from the first identification element 15, so that the first color 151 (which is a green color) of the first identification element 15 will be shown at the corresponding opening 114 of the rod body 11. In other words, a user (not shown in the figure) can know the current normal adhesive state of the sucking disc type apparatus 1 by the indication of the color.

Figure 5:
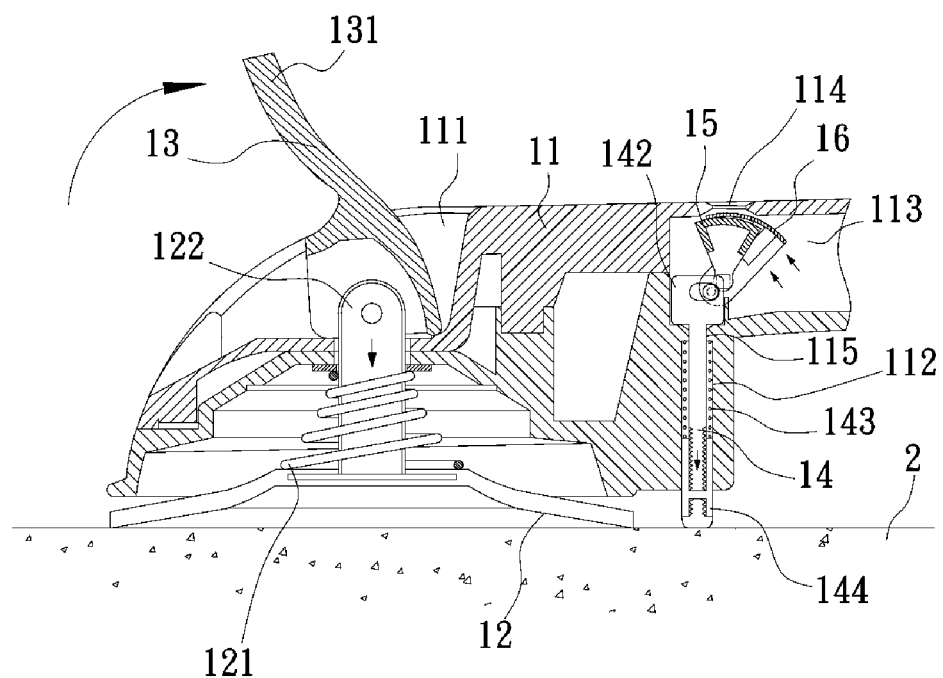
FIG. 5 is another cross-sectional view of a preferred embodiment of the invention.

In FIGS. 2, 3 and 5, FIG. 5 shows another cross-sectional view of a preferred embodiment of the present invention, a user lifts the operating portion 131 of the pressing rod 13 to turn the pressing rod 13 with respect to the rod body 11 (as indicated by the arrow of the FIG. 5) and to separate the sucking disc type apparatus 1 from the wall 2, and the pressing rod 13 is used similarly the principle of a cam to drive the rod body 11 to be separated from the wall 2. By the resilience of the return spring 143, the first end 141 of the operating rod 14 will be protruded elastically out from the rod body 11, and the second end 142 of the operating rod 14 will drive the second identification element 16 to turn with respect to the first identification element 15, so that the second identification element 16 will cover the first identification element 15. In other words, the second color 161 (which is a red color) of the second identification element 16 will cover the first color 151 (which is a green color) of the first identification element 15, and be shown at the corresponding opening 114 of the rod body 11, so that the users can know about the current separated state of the sucking disc apparatus 1.

In summation of the description above, the present invention improves the prior art by separately manufacturing the first identification element 15 and the second identification element 16 with different colors, and such arrangement makes the manufacturing process easier, and provides a way of manufacturing the first identification element 15 and the second identification element 16 by separate molds for the different colors. The present invention no longer uses the adhesive tape that falls off easily, but it achieves the effect of determining the adhesive state of the first identification element 15 and the second identification element 16. Thus, the invention complies with the patent application requirements, and thus is duly filed for patent application.

While the invention has been described by means of specific embodiments, numerous modifications and variations could be made thereto by those skilled in the art without departing from the scope and spirit of the invention set forth in the claims.

What is claimed is:

1. An improved sucking disc apparatus, capable of detecting an adhesive force, comprising:
    a rod body, comprising at least one slot, at least one slide, at least one containing space, and at least one opening, wherein the slide, the containing space and the opening are interconnected with each other, and the slide has a flange protruded from the slide;
    at least one sucking disc, installed at the rod body and corresponding to the slot, comprising a spring with both ends abutted at the sucking disc and the rod body respectively;
    at least one pressing rod, pivotally coupled to either the slot or the sucking disc, turned with respect to the rod body and abutted at the sucking disc;
    at least one operating rod, installed at the slide and slid with respect to the rod body, comprising a first end, a second end and a return spring, wherein the first end is protruded from the rod body, and the second end is protruded out from the containing space, and both ends of the return spring is abutted at the flange and the first end respectively;
    at least one first identification element, comprising an axial shaft, wherein the first identification element is installed in the containing space by the axial shaft, and the first identification element further comprises a first color corresponding to he opening; and
    at least one second identification element, coaxially and pivotally coupled at the axial shaft and the second end, wherein the second identification element is turned with respect to the first identification element and stacked onto the first identification element, and the second identification element comprises a second color corresponding to the opening, and the second color and the first color being different colors.

2. The sucking disc apparatus of claim 1, wherein the first end is sheathed into a sleeve, and the return spring abuts at the sleeve.

3. The sucking disc apparatus of in claim 1, wherein the second identification element is stacked onto the first identification element and disposed on the top of the first identification element.

4. The sucking disc apparatus of claim 1, wherein the first identification element is a fan-shape.

5. The sucking disc apparatus of claim 1, wherein the second identification element is an arc-shape.

6. The sucking disc apparatus of claim 1, wherein the second identification element is pivotally coupled to the second end by an axle.

7. The sucking disc apparatus of claim 1, wherein the pressing rod is pivotally coupled to either the slot or the sucking disc by an axle.

8. The sucking disc apparatus of claim 1, wherein the pressing rod comprises an operating portion.

9. The sucking disc apparatus of in claim 1, wherein the sucking disc comprises a protruding rod protruded out from the slot, and the pressing rod is pivotally coupled to the protruding rod.

10. The sucking disc apparatus of claim 9, wherein the spring is sheathed onto the protruding rod, and both ends of the spring are abutted at the sucking disc and the rod body respectively.

* * * * *